UNITED STATES PATENT OFFICE.

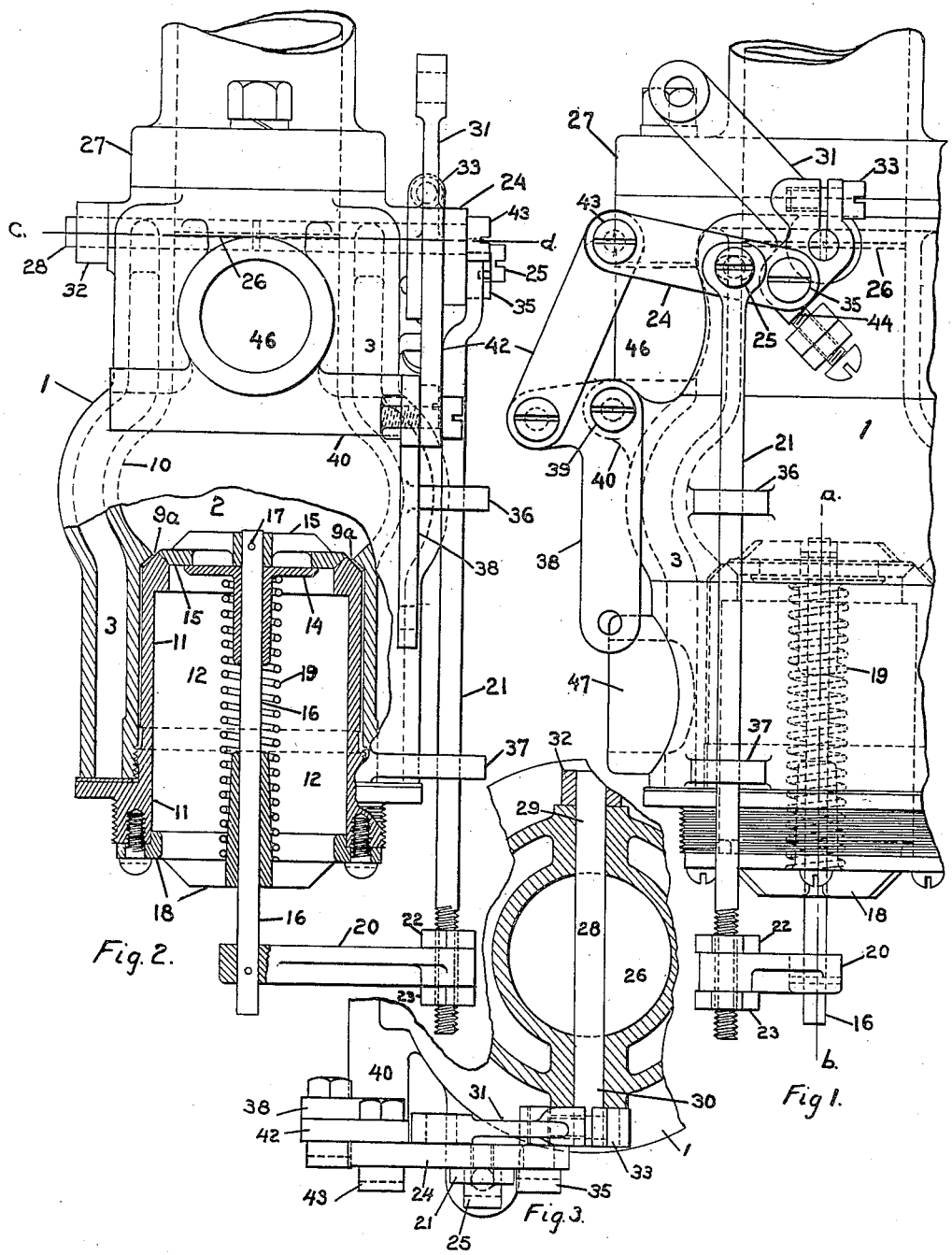

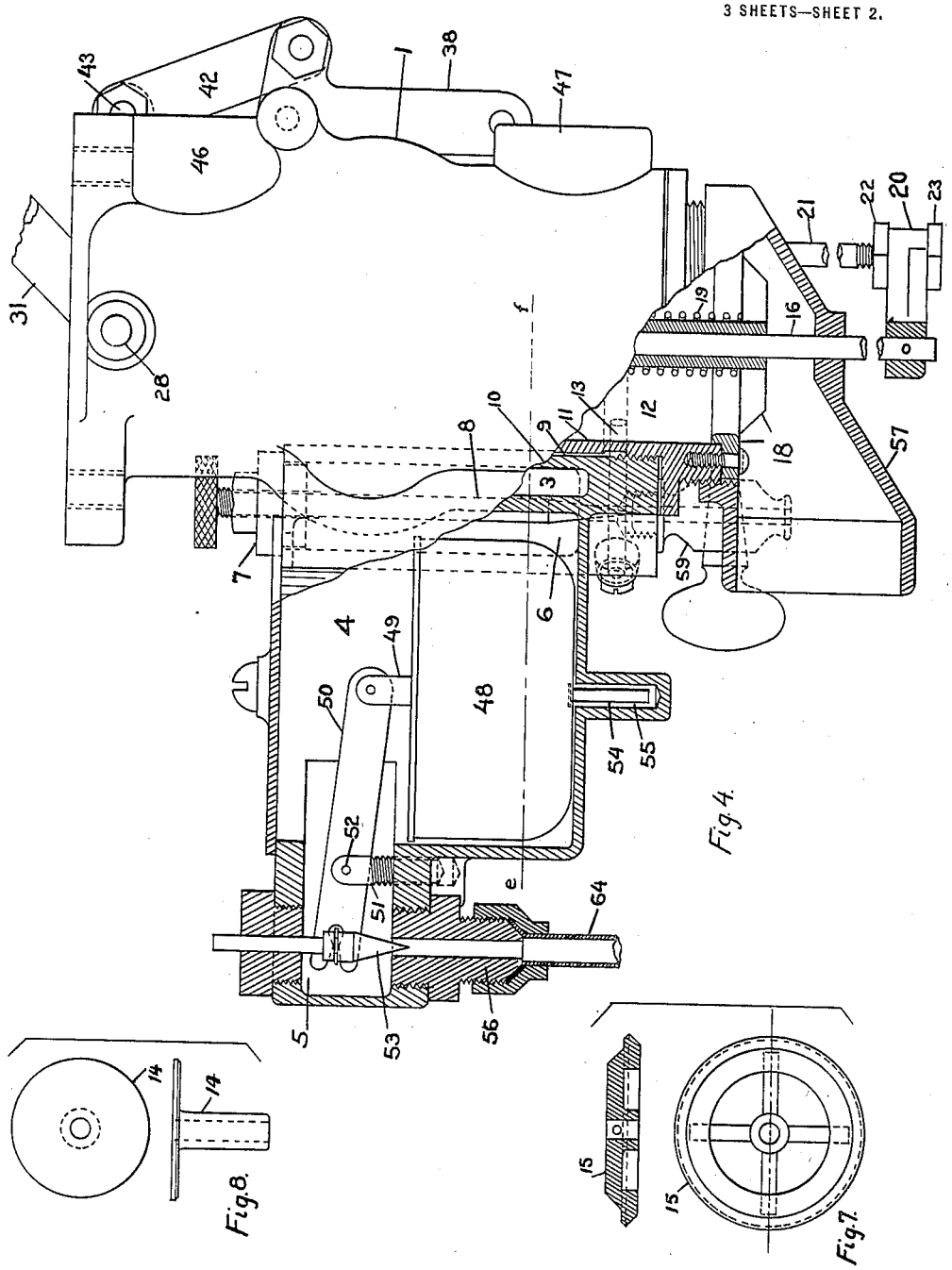

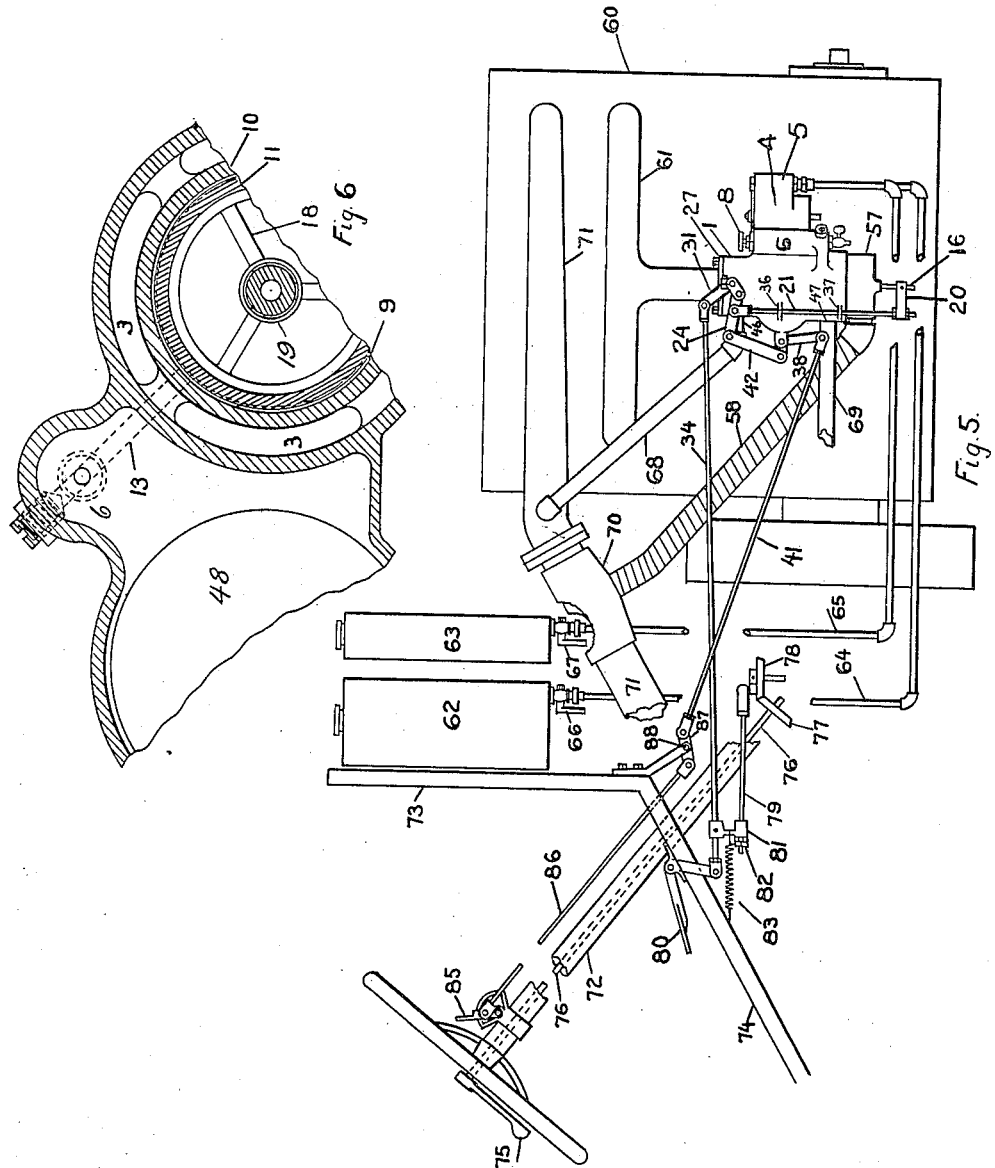

FRANK L. SESSIONS, OF LAKEWOOD, OHIO.

CARBURETER.

1,235,165.  Specification of Letters Patent.  Patented July 31, 1917.

Application filed March 26, 1914. Serial No. 827,374.

*To all whom it may concern:*

Be it known that I, FRANK L. SESSIONS, a citizen of the United States, residing at Lakewood, in the county of Cuyahoga and State of Ohio, have invented certain new and useful Improvements in Carbureters, of which the following is a specification.

My invention relates to carbureters and has for its principal object, the correct proportioning of air and fuel by manual control of valves governing the admission of air to the mixing chamber and of the mixture of air and fuel to the engine cylinder.

I accomplish this object by employing the construction shown in the accompanying drawings in which Figure 1 is a side elevation of a portion of a carbureter embodying my improvements; Fig. 2 is a partial end elevation and partial section on line $ab$ of Fig. 1; Fig. 3 is a partial section on line $cd$; Fig. 4 is a side view partly in section showing the float chamber and the air and fuel inlets; Fig. 5 shows one of my improved carbureters installed upon an automobile engine; Fig. 6 is a fragmentary section on line $ef$ of Fig. 4; Figs. 7 and 8 show details.

Referring to the drawings, 1 is the main body of the carbureter, comprising the mixing chamber 2, the heating jacket 3, the float chamber 4, the float valve chamber 5 and the needle valve chamber 6. 5 and 6 are branch compartments of 4.

7 is a plug screwed into the top of the needle valve chamber and threaded internally to receive the stem of the needle valve 8. 9 is a fuel heating chamber of annular cross section between the wall 10 of the heating jacket 3 and the wall 11 of the air inlet passage 12. 9ª is the fuel nozzle orifice of an annular cross section. 13 is a fuel duct, or passage for conducting the fuel from the needle valve 8 to the fuel heating chamber 9. 14 is a reverse acting relief valve having its seat upon the under side of air inlet valve 15, and sliding upon the valve stem 16. 17 is a pin for securing valve 15 to stem 16. 18 is a bearing support for valve stem 16. 19 is a spring which is seated upon bearing support 18 and, normally, holds valve 14 closed. 20 is an arm carried by stem 16. 21 is a rod adjustably secured to the arm 20 by nuts 22, 23, at one end, and pivotally secured to the connecting lever 24 by screw 25 at the other end.

26 is a throttle valve of ordinary construction, which controls the admission of the mixture of fuel and air to the engine cylinder. 27 is a flange upon the intake manifold of the engine to which the carbureter is connected.

28 is a shaft which carries the throttle valve 26 and is held in bearings 29, 30 formed in the body 1. Shaft 28 extends outward at both ends, so that the throttle operating arm 31 may be secured to one end and the thrust collar 32 to the other. 31 is shown clamped to shaft 28 by screw 33 in a well known manner. 31 is in the form of a bell crank lever, one arm of which is connected to the operating rod 34 and the other arm of which is connected to the mixture proportioning lever 24 by means of pivot screw 35. Rod 21 is free to move axially in bearings formed in the supporting lugs 36 and 37 of the body 1. Where the screw 25 passes through the flattened and widened end of rod 21, the latter is slotted to accommodate the movement of screw 25 when mixture proportioning lever 24 assumes its various positions.

Bell crank lever 38 is fulcrumed by screw 39 to the boss 40 formed upon body 1. One arm of lever 38 is connected to operating rod 41, and the other arm to link 42 which transmits motion from lever 38 to mixture proportioning lever 24. Screw 43 forms a connecting pivot between link 42 and lever 24. 44 is an adjustable screw stop for limiting the rotation of throttle lever 31. 46, 47 are inlet and outlet openings to the heating jacket 3.

In Fig. 4 there are shown the float chamber 4, the float 48, the float connecting post 49, the float lever 50, the adjustable fulcrum post 51, the fulcrum pin 52 and the float valve 53. 54 is a guide pin secured to the bottom of the float 48 and guided by the closed hole 55 in the bottom of the float chamber. 56 is the fuel pipe connection to the float valve. 57 is an air pipe connection to the air inlet which may be used when the carbureter is connected to receive hot air through a pipe, such as shown at 58 in Fig. 5. 59 is a drain cock for the float chamber. These details are shown somewhat conventionally, and it will be understood that their construction may be varied without affecting the scope of my invention.

In Fig. 5, one of my improved carbureters is shown connected to an engine of the well known, multicylinder automobile type. 60 is the engine having the intake manifold 61, with flange 27 to which the carbureter is attached. 62, 63 are fuel storage tanks, one of which may be used for kerosene or heavy fuel oil and the other for gasolene or other volatile fuel. 64, 65 are the fuel supply pipes to the carbureter and 66, 67 are valves in these pipes for controlling the flow of fuel in them. 68, 69 are respectively inlet and outlet pipes, for conducting a portion of the exhaust gases to and from the heating jacket. 70 is a sleeve or stove surrounding the exhaust pipe 71 and connected to the air intake 57 of the carbureter by the flexible pipe 58. Between the sleeve 70 and the exhaust pipe 71 there is sufficient space for the admission of the air required by the carbureter, and this air coming in contact with the hot exhaust pipe is heated before it enters the carbureter.

It will be understood that other means than those described for supplying heat to the heating jacket and to the intake air may be employed without affecting the scope of my invention. 72 represents the steering post of an automobile, 73 the dash, and 74 the floor. 75 is the throttle control lever on the steering post, 76 is the shaft which transmits motion to the throttle lever 31, through the bevel gears 77, 78 and operating rods 79 and 34. 80 is a foot lever, commonly known as "accelerator" which is connected to the rod 34 and may be used for operating the throttle valve 26. 81 is a connecting arm between rods 79 and 34. It is rigidly secured to 34 but is free to slide upon 79, except that it is limited by the nut and jam nut 82, in the direction of travel for closing the throttle. 83 is a spring which is connected between 81 and a stationary point and acts normally to close the throttle 26, by returning the arm 81 against the nut 82 upon rod 79.

Upon the steering post 72 is mounted the lever 85 which is connected to operate the bell crank lever 38 through the motion transmitting means consisting of rod 86, lever 87 and rod 41. Lever 87 is fulcrumed to a stationary support at 88.

The operation of the improved devices herein described is as follows:

Assuming that the throttle valve 26 and air inlet valve 15 are closed and the engine is about to be started, the operator, before cranking the engine, will move the lever 75 so as to open both the throttle valve 26 and air inlet valve 15 an amount which experience has proven necessary. Upon the engine being cranked air will be drawn through the opening of valve 15 past the fuel nozzle 9ª, carrying with it a quantity of the fuel which quantity will depend upon the velocity of the air past the fuel nozzle. In order to readily start an internal combustion engine, particularly in cold weather, it is necessary that it draw in a very rich mixture of air and fuel. But, after the engine is started and has become warm, it is necessary for economy of fuel and satisfactory running to reduce the quantity of fuel. By means of the lever 85 and its connection to the mixture proportioning lever 24, air inlet valve 15 may be opened or closed independently of the throttle valve 26, it being understood that both levers 75 and 85 are frictionally or otherwise held against movement except by the hand of the operator. With a given opening of throttle valve 26, a further opening of air inlet valve 15 will result in a "leaner" mixture of air and fuel, while a further closing of valve 15 will result in a "richer" mixture.

It will be observed that both the throttle valve 26 and air inlet valve 15 operate in unison by the movement of levers 75 or 80 but that the relative opening of valve 15 may be independently varied by the movement of lever 85, which raises or lowers the mixture proportioning lever 24.

Link, 42, with the pivot screw, 43, form an adjustable support or fulcrum for lever, 24. By changing the position of this support through the movement of lever, 85, and its connections to link, 42, the air inlet valve, 15, may be given any initial opening found necessary without disturbing the throttle valve, 26. It is to be noted, however, that throttle valve, 26, may be operated at the same time that the relative opening of air inlet valve, 15, is being changed.

By this interconnection of the throttle and air inlet valves an extremely accurate control of the mixture of air and fuel is possible, so that after a short experience, an operator can run his engine with economy under the varying conditions of load, fuel, and atmosphere encountered in the operation of internal combustion engines.

It will be evident to those skilled in the art that the ratio of rates of opening of valves 15 and 26 may be varied by varying the relative proportions of the arms of levers 31 and 24, or by varying the angle of the bell crank 31 so that pivot screw 35 will traverse a different portion of the circle it describes about the axis of rod 28.

Besides the matter of starting the engine which may require a temporary indrawing of a "rich" mixture, there are other conditions such as humidity of the atmosphere, variations in fuel, or variations in temperature, which are known to affect the operation of engines of the character being considered, so that for the best results it is necessary to vary the proportions of air and fuel used. For such varying of proportions, different means have heretofore been proposed, some of them arranged to be automatically brought into action and others being manually controlled.

My invention possesses particular advantages over such prior inventions in the simplicity and effectiveness of the arrangement of parts, the saving in cost to manufacture and to install, and in other matters.

Other modes of applying the principle of my invention may be employed instead of the one herein described, change being made as regards the mechanism herein disclosed, provided the means stated by any one of the following claims or the equivalent of such stated means be employed.

I therefore claim as my invention:

1. In a carbureter, a casing provided with a mixing chamber, an air inlet, a fuel inlet, and a mixture outlet, a throttle valve in the mixture outlet, an air inlet valve in the air inlet, a shaft carrying the throttle valve and having bearings in said casing, an arm secured to said shaft for operating said throttle valve, a lever having a fulcrum pin on said arm eccentric to said shaft, means connecting said lever to said air inlet valve, and means connected to said lever for operating said lever and to form a fulcrum support to said lever when motion is transmitted to it by said arm.

2. In a carbureter, a casing provided with a mixing chamber, an air inlet, a fuel inlet, and a mixture outlet, a throttle valve in the mixture outlet, an air inlet valve in the air inlet, a shaft carrying the throttle valve, an arm secured to the shaft for operating the throttle valve, a lever fulcrumed on said casing, a link pivotally connected to said lever, a second lever pivoted at one end to a point on said arm eccentric to said shaft and pivoted at the other end to said link, and means connecting a point on said second lever with the air inlet valve to operate the latter.

3. In a carbureter, a casing provided with a mixing chamber having an air inlet, a fuel inlet, and a mixture outlet, a throttle valve in the mixture outlet, an air inlet valve in the air inlet, a shaft carrying the throttle valve having bearings in the casing, an arm secured to the shaft for operating the throttle valve, means connected to the air inlet valve for operating it, a lever pivoted at one end to a point on the arm eccentric to the shaft and pivoted at the other end to a member adapted when moved to transmit motion to the lever, the lever being connected at a point between its ends to the means for operating the air inlet valve.

4. In a carbureter, a casing provided with a mixing chamber, an air inlet, a fuel inlet, and a mixture outlet, a throttle valve in the mixture outlet, an air inlet valve in the air inlet, a shaft carrying the throttle valve and supported in the casing, an arm secured to the shaft for operating the throttle valve, means for operating the arm, means for operating the air inlet valve, a lever fulcrumed to the arm at a point eccentric to the shaft and operatively connected to the means for operating the air inlet valve, a link pivoted to the lever and adapted to serve as a fulcrum support for the lever when the arm is moved, and to transmit motion to the lever to cause the lever to rotate about its fulcrum on the arm when the link is moved, and means for imparting motion to said link.

5. In a carbureter, a casing provided with a mixing chamber, an air inlet, a fuel inlet, and a mixture outlet, a throttle valve in the mixture outlet, an air inlet valve in the air inlet, a shaft carrying the throttle valve and having a bearing in the casing, an arm secured to the shaft and operatively connected to means for imparting motion to the arm, a lever pivoted at one point to the arm, at another point to an adjustable support, means connecting the lever with the air inlet valve for operating the air inlet valve, and means for changing the position of the adjustable support.

In testimony whereof I have affixed my signature in presence of two witnesses.

FRANK L. SESSIONS.

Witnesses:
H. E. WETHERBEE,
DONALD G. CRIGHTON.